US011486826B2

(12) United States Patent
Arend et al.

(10) Patent No.: US 11,486,826 B2
(45) Date of Patent: Nov. 1, 2022

(54) PANEL RETARDANCE MEASUREMENT

(71) Applicant: Magic Leap, Inc., Plantation, FL (US)

(72) Inventors: Erik Heath Arend, Boulder, CO (US); Volker Zagolla, Lausanne (CH); Carlos Alberto Macias Romero, Pully (CH); Bradley Jay Sissom, Boulder, CO (US); Miller Harry Schuck, III, Erie, CO (US); Heidi Leising Hall, Webster, NY (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/582,828

(22) Filed: Jan. 24, 2022

(65) Prior Publication Data
US 2022/0146421 A1    May 12, 2022

Related U.S. Application Data

(63) Continuation of application No. PCT/US2020/043544, filed on Jul. 24, 2020.
(Continued)

(51) Int. Cl.
*G01N 21/43*      (2006.01)
*G01N 21/84*      (2006.01)

(52) U.S. Cl.
CPC ..... *G01N 21/43* (2013.01); *G01N 2021/8477* (2013.01)

(58) Field of Classification Search
CPC ........... G01N 21/43; G01N 2021/8477; G02B 27/286; G02B 5/3083; G02B 2027/0107;
(Continued)

(56) References Cited

U.S. PATENT DOCUMENTS 4,692,026 A * 9/1987 Gawrisch ........... G01B 11/0691
                                                       356/492
5,929,946 A * 7/1999 Sharp ................... H04N 9/3111
                                                       349/97
(Continued)

FOREIGN PATENT DOCUMENTS

CN        101326818 A * 12/2008 ........... H04N 9/3167
EP         2631909 B1 * 9/2019 ........... G03H 1/2249
(Continued)

OTHER PUBLICATIONS

Watanabe et al. "Full-field optical coherence tomography by achromatic phase shifting with a rotating polarizer", App. Opt. (44) N. 8 (Mar. 2005), pp. 1387-1392.*
(Continued)

*Primary Examiner* — Mohamed K Amara
(74) *Attorney, Agent, or Firm* — Kilpatrick Townsend & Stockton LLP

(57) ABSTRACT

A method for determining a residual retardance of an LCOS (Liquid Crystal on Silicon) panel includes transmitting a light beam to the LCOS panel at an angle of incidence and measuring an intensity of a reflected light beam. The method includes biasing the LCOS panel in a dark state and measuring a dark state intensity of the reflected light beam. The method also includes biasing the LCOS panel in a bright state, and measuring a bright state intensity of the reflected light beam. A residual retardance of the LCOS panel is determined based on a contrast ratio of the bright state intensity and the dark state intensity. The method can also include selecting a compensator for the LCOS panel based on the residual retardance.

18 Claims, 8 Drawing Sheets

Related U.S. Application Data

(60) Provisional application No. 62/879,197, filed on Jul. 26, 2019.

(58) Field of Classification Search
CPC ........... G02F 1/13363; G02F 1/136277; G02F 2413/15; G03B 21/005
See application file for complete search history.

(56) References Cited

U.S. PATENT DOCUMENTS

| | | | |
|---|---|---|---|
| 7,152,977 B2* | 12/2006 | Ruda | G02B 17/02 353/98 |
| 7,518,662 B2 | 4/2009 | Chen et al. | |
| 8,488,246 B2* | 7/2013 | Border | G06Q 30/02 359/13 |
| 10,690,916 B2* | 6/2020 | Popovich | G02B 27/0179 |
| 2004/0179158 A1 | 9/2004 | Silverstein et al. | |
| 2004/0227898 A1* | 11/2004 | Ma | H04N 9/3114 348/E9.027 |
| 2005/0128380 A1* | 6/2005 | Zieba | G02F 1/133634 349/96 |
| 2005/0259205 A1* | 11/2005 | Sharp | G02B 5/3083 349/129 |
| 2005/0264734 A1* | 12/2005 | Robinson | G02F 1/13363 349/119 |
| 2006/0028620 A1* | 2/2006 | Conner | G02B 5/04 348/E9.027 |
| 2006/0066805 A1 | 3/2006 | Grunnet-Jepsen et al. | |
| 2006/0285042 A1* | 12/2006 | Chen | G03B 21/14 349/5 |
| 2007/0064163 A1* | 3/2007 | Tan | G02F 1/133632 349/5 |
| 2007/0085972 A1* | 4/2007 | Tan | H04N 9/3182 348/E9.027 |
| 2007/0146695 A1* | 6/2007 | Brouwer | B82Y 10/00 356/237.4 |
| 2007/0242228 A1* | 10/2007 | Chen | G03B 21/2066 353/20 |
| 2008/0013051 A1* | 1/2008 | Glinski | G02F 1/133528 348/E9.027 |
| 2009/0002579 A1* | 1/2009 | Tan | G02F 1/13363 349/8 |
| 2010/0253769 A1* | 10/2010 | Coppeta | G02B 27/286 353/7 |
| 2012/0212399 A1* | 8/2012 | Border | G02B 27/0172 345/8 |
| 2016/0077338 A1* | 3/2016 | Robbins | G02B 27/4205 359/489.08 |
| 2016/0187654 A1* | 6/2016 | Border | G02B 27/0172 359/630 |
| 2019/0179149 A1 | 6/2019 | Curtis et al. | |
| 2020/0033672 A1* | 1/2020 | Leister | G02F 1/133528 |
| 2020/0209667 A1* | 7/2020 | Sharlin | G02B 6/0015 |
| 2021/0349326 A1* | 11/2021 | Peng | G02F 1/136277 |

FOREIGN PATENT DOCUMENTS

| | | | | |
|---|---|---|---|---|
| JP | 2007004144 A | 1/2007 | | |
| JP | 2007011280 A | 1/2007 | | |
| JP | 2009037226 A | 2/2009 | | |
| JP | 2009505141 A | 2/2009 | | |
| JP | 2009518685 A | 5/2009 | | |
| JP | 5148631 B2 * | 2/2013 | ......... | G02B 27/2214 |
| WO | 9848320 A1 | 10/1998 | | |
| WO | WO-2013129693 A1 * | 9/2013 | ............ | G02B 5/305 |
| WO | 2014112212 A1 | 7/2014 | | |
| WO | 2021021648 A1 | 2/2021 | | |

OTHER PUBLICATIONS

Application No. PCT/US2020/043544, International Search Report and Written Opinion, dated Oct. 16, 2020, 7 pages.

Application No. PCT/US2020/043544, International Preliminary Report on Patentability, dated Feb. 10, 2022, 6 pages.

Anderson et al., "53.1: Off-Axis LCoS Compensation for Enhanced Contrast", International Symposium Digest of Technical Papers, vol. 34, 2003, pp. 1433-1435.

Application No. EP20847302.5, "Extended European Search Report", dated Aug. 23, 2022, 8 pages.

Application No. JP2022-504627, "Office Action" and English Translation, dated Aug. 22, 2022, 7 pages.

Wolfe et al., "Polarimetric Characterization of Liquid-Crystal-on-Silicon Panels", Applied Optics, XP001241158, vol. 45, No. 8, Mar. 10, 2006, pp. 1688-1703.

* cited by examiner

PANEL RETARDANCE MEASUREMENT

CROSS-REFERENCES TO RELATED APPLICATIONS

This application is a continuation of International Patent Application No. PCT/US2020/043544, filed Jul. 24, 2020, entitled "PANEL RETARDANCE MEASUREMENT," which claims the benefit of priority to U.S. Provisional Patent Application No. 62/879,197, filed Jul. 26, 2019, entitled "PANEL RETARDANCE MEASUREMENT," the entire contents of which are hereby incorporated by reference for all purposes.

BACKGROUND

LCOS (Liquid Crystal on Silicon) panels are attractive for use as the light modulators in projection display systems, such as near-eye display systems, due in part to the ability to integrate the pixel switches and interconnecting circuitry and components on a silicon substrate, enabling the high pixel density needed for high resolution displays. However, the LCOS panel can introduce a residual retardance, which limits the contrast of the displayed image. Further, the residual retardance can vary for different LCOS panels. Therefore, it is often necessary to determine the residual retardance for every LCOS panel in a production environment.

However, conventional techniques for determining the residual retardance of an LCOS panel have many drawbacks. The drawbacks include requiring expensive equipment and highly skilled personnel, and time-consuming operation. The effect of these drawbacks are magnified in a high-volume production environment. Therefore, there is a need in the art for improved residual retardance techniques for LCOS panels.

SUMMARY OF THE INVENTION

This disclosure generally relates to display devices using LCOS (Liquid Crystal on Silicon) panels. Some embodiments of the present invention provide systems and method for determining the residual retardance of an LCOS panel in an efficient and a cost-effective manner.

Conventional methods for measuring residual retardance of LCOS panels often involve expensive equipment and highly skilled operators, and can be time consuming. In a high volume production environment, these drawbacks become more serious. In some embodiments, a system and method are provide to estimate the residual retardance of an LCOS panel by using the contrast ratio as calculated by the reflected light intensity in a bright state and a dark state. Further, the system and method can also provide an alignment angle of the compensator with respect to the LCOS panel. Based on residual retardance value and alignment angle, the compensator can be chosen to maximize the intensity contrast of the product. The system and method provided in embodiments of the invention are efficient and cost-effective, and is well suited for a high-volume production environment.

According to some embodiments, a method for determining a residual retardance of a Liquid Crystal on Silicon (LCOS) panel includes providing a light beam from a light source and transmitting the light beam to the LCOS panel at a non-normal angle of incidence. The light beam passes through a transmitter optics group, a circular polarizer, and a bias retarder to reach the LCOS panel. The method also includes reflecting the light beam from the LCOS panel through the bias retarder, the circular polarizer, and a receiver optics group to a detector for measuring an intensity of a received light beam. The method also includes determining a retarder alignment angle by rotating the bias retarder and measuring an intensity of the received light beam with the LCOS panel in a dark state, and identifying a rotation angle of the bias retarder associated with a minimum of the intensity of the received light beam as the retarder alignment angle. With the bias retarder disposed at the retarder alignment angle and the LCOS panel in the dark state, a dark state intensity of the received light beam is measured. With the bias retarder disposed at the retarder alignment angle and the LCOS panel in a bright state, a bright state intensity of the received light beam is measured. The method also includes determining a contrast ratio of the bright state intensity and the dark state intensity. A total retardance is determined based on the contrast ratio of the bright state intensity and the dark state intensity. A residual retardance of the LCOS panel based on the total retardance is determined. The method also includes selecting a compensator for the LCOS panel based on the residual retardance, and designating the retarder alignment angle of the bias retarder as a compensator alignment angle of the selected compensator with respect to the LCOS panel.

In some embodiments of the above method, determining the residual retardance of the LCOS panel includes removing retardance of the bias retarder and retardance of the circular polarizer from the total retardance.

In some embodiments, determining the total retardance ($\gamma$) based on the contrast ratio (CR) comprises using the following equation to determine the total retardance ($\gamma$):

$$1/CR = \sin^2(2\pi\gamma/\lambda).$$

In some embodiments, the transmitter optics group includes a collimating lens and a focusing lens.

In some embodiments, the receiver optics group includes a collimating lens and a focusing lens.

According to some embodiments, a method for determining a residual retardance of a Liquid Crystal on Silicon (LCOS) panel includes transmitting a light beam to the LCOS panel at an angle of incidence and measuring an intensity of a reflected light beam, biasing the LCOS panel in a dark state, measuring a dark state intensity of the reflected light beam, biasing the LCOS panel in a bright state, measuring a bright state intensity of the reflected light beam, determining a residual retardance of the LCOS panel based on a contrast ratio of the bright state intensity and the dark state intensity, and selecting a compensator for the LCOS panel based on the residual retardance.

In some embodiments of the above method, the angle of incidence is a non-normal angle of incidence.

In some embodiments, the angle of incidence is a normal angle of incidence.

In some embodiments, the method also includes determining the contrast ratio of the bright state intensity and the dark state intensity, determining a total retardance based on the contrast ratio of the bright state intensity and the dark state intensity, and determining the residual retardance of the LCOS panel based on the total retardance.

In some embodiments, determining the total retardance ($\gamma$) based on the contrast ratio (CR) includes using the following equation to determine the total retardance ($\gamma$):

$$1/CR = \sin^2(2\pi\gamma/\lambda).$$

In some embodiments, determining the residual retardance of the LCOS panel includes removing retardance of the bias retarder and retardance of the circular polarizer from the total retardance.

In some embodiments, transmitting a light beam to the LCOS panel comprises transmitting the light beam thorough a polarizer to the LCOS panel.

In some embodiments, measuring an intensity of the reflected light beam includes passing the reflected light beam through the polarizer to a detector.

In some embodiments, the polarizer includes a circular polarizer.

In some embodiments, the polarizer includes a linear polarizer.

In some embodiments, transmitting a light beam to the LCOS panel includes transmitting the light beam thorough a transmitter optics group including a collimating lens and a focusing lens.

In some embodiments, transmitting a light beam to the LCOS panel includes transmitting the light beam through a bias retarder to the LCOS panel.

In some embodiments, measuring an intensity of the reflected light beam includes passing the reflected light beam through the bias retarder to a detector.

In some embodiments, the method also includes determining a retarder alignment angle for the bias retarder, by rotating the bias retarder and measuring the intensity of the reflected light beam with the LCOS in a dark state, and identifying a rotation angle of the bias retarder associated with a minimum of the intensity as the retarder alignment angle for the bias retarder.

In some embodiments, the method also includes comprising identifying the retarder alignment angle of the bias retarder as the compensator alignment angle of the selected compensator with respect to the LCOS panel.

According to some embodiments, a system for determining a residual retardance of a Liquid Crystal on Silicon (LCOS) panel includes a holder for the LCOS panel, a bias retarder disposed over the LCOS panel, a polarizer disposed over the bias retarder, a transmitter optics group disposed over the polarizer, a light source disposed over the transmitter optics group, wherein the transmitter optics group is configured to focus a light beam from the light source, through the polarizer and the bias retarder, to the LCOS panel at a non-normal incident angle. The system also includes a receiver optics group disposed over the polarizer and a detector disposed over the receiver optics group for measuring an intensity of light reflected from the LCOS panel. The receiver optics group is configured to focus a light beam reflected from the LCOS panel, through the bias retarder and the polarizer, to the detector. The system also a controller for alternatively biasing the LCOS panel into a dark state and into a bright state.

In some embodiments, the system is configured to determine a bright state intensity and a dark state intensity of light reflected from the LCOS panel.

In some embodiments, the system is configured to determine the residual retardance of the LCOS panel based on a contrast ratio of the bright state intensity and the dark state intensity of the light reflected from the LCOS panel.

In some embodiments, determining the total retardance ($\gamma$) based on the contrast ratio (CR) comprises using the following equation to determine the total retardance ($\gamma$):

$$1/CR = \sin^2(2\pi\gamma/\lambda).$$

In some embodiments, the polarizer includes a circular polarizer.

In some embodiments, the polarizer includes a linear polarizer.

A further understanding of the nature and advantages of the present invention may be realized by reference to the remaining portions of the specification and the drawings.

DETAILED DESCRIPTION OF THE INVENTION

In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of this disclosure. Rather, the ensuing description of the exemplary embodiments will provide those skilled in the art with an enabling description for implementing an exemplary embodiment. For example, while the description might describe pixel information, images, and/or displaying, it should be recognized that audio may be generated and presented to a user by an augmented reality device instead of or in addition to visual content. It should also be understood that various changes may be made in the function and arrangement of elements without departing from the spirit and scope of the disclosure as set forth in the appended claims.

In a liquid crystal on silicon (LCOS display, a CMOS chip controls the voltage on square reflective aluminum electrodes buried just below the chip surface, each controlling one pixel. Each electrode can control a pixel in the display, each with an independently addressable voltage. A common voltage for all the pixels is supplied by a transparent conductive layer made of indium tin oxide (ITO) on the cover glass.

Figure 1:
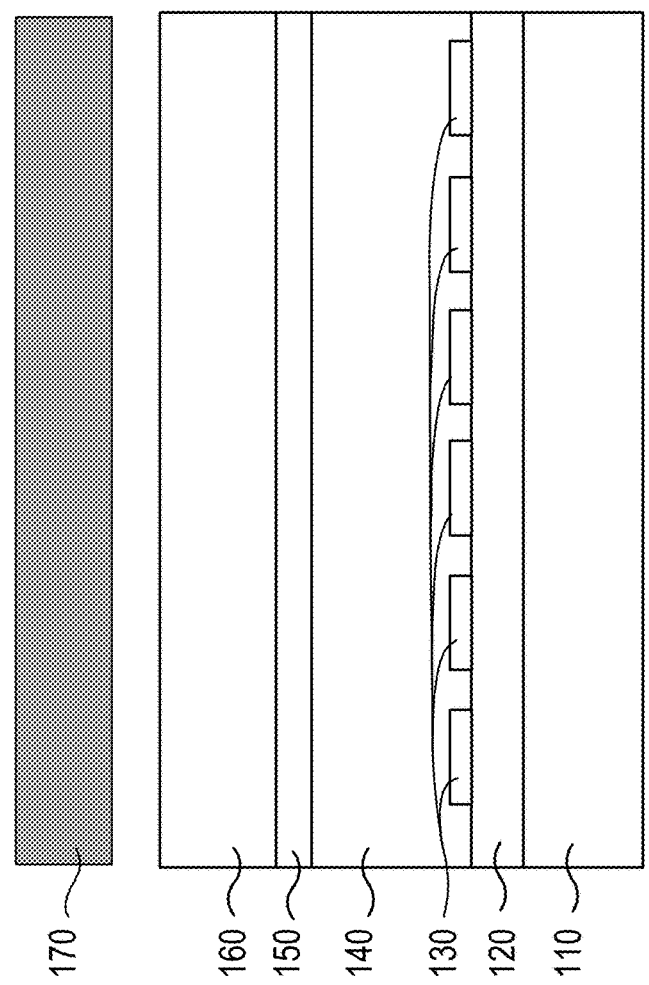
FIG. 1 illustrates a cross-sectional view of a LCOS (Liquid Crystal on Silicon) device.

FIG. 1 is a simplified cross-sectional view diagram illustrating an LCOS device. As shown in FIG. 1, the LCOS device 100 includes a silicon substrate 110, which can include a CMOS layer. On the silicon substrate 110, there can be an insulating layer 120, a plurality of reflective pixel electrodes 130, a liquid crystal layer 140, a transparent electrode 150, such as indium tin oxide (ITO), a transparent cover glass layer 160, and a compensator 170.

LCOS device 100 is a reflective LCOS device. In operation a polarized light beam is directed onto at least a portion of the LCOS device 100. The polarized light beam passes through transparent cover glass layer 160, the transparent electrode 150, and liquid crystal layer 140. The polarized light beam is reflected by the reflective pixel electrodes 130, passes back through liquid crystal layer 140, and through transparent cover glass layer 160. Where a voltage is applied across the liquid crystal material, the polarization of the light beam is altered, for example, from one linear polarization to an orthogonal linear polarization. In this sense, the liquid crystal layer 140 acts as a polarization modulator, depending on a voltage difference applied between the pixel electrodes 130 and the transparent electrode 150. As a result, the liquid crystal layer 140, in addition to a polarizing element acting as a polarization analyzer, can be in a bright state to allow the passage of light or in a dark state to block the light. The polarization-modulated light beam emerges from the reflective LCOS device 100. The polarization-modulated light beam may then be passed though imaging lenses onto a screen to display an image.

When LOCS device 100 is driven to the dark state, it can introduce a residual retardance on light impinging thereupon, thereby limiting the contrast of the displayed image. To compensate for residual retardance, and thus, achieve a desired contrast ratio, as shown in FIG. 1, an LCOS device 100 may be supplied with a compensator 170 placed on the cover glass layer 160. The compensator 170, also referred to as a compensator foil, is designed to induce a birefringence such that light passing therethrough experiences an opposite retardance to the residual retardance produced by the reflective LCOS. Accordingly, the contrast of a displayed image is improved.

Further discussion of the problems of residual retardance in an LCOS device and the use of compensation may be found in Shimizu U.S. Pat. Application Publication No. 2006/0256263, the entirety of which is hereby incorporated herein by reference for all purposes.

In order to match the appropriate compensator to an LCOS device, it can be necessary to determine the residual retardance of each individual LCOS panel. Unfortunately, there are disadvantages associated with conventional methods for measuring residual retardance. For example, some conventional systems may use a parameter-based method, using a series of known input polarization states, measuring output polarization states, and directly calculating retardance. Such conventional methods for measuring residual retardance of LCOS panels often involve expensive equipment and highly skilled operators, and can be time consuming. In a high volume production environment, these drawbacks become more serious.

Embodiments of the present invention provide systems and methods for determining the residual resistance of LCOS panels in a cost-effective and time-saving manner. The use of expensive equipment is reduced or eliminated and the methods and systems described herein are particularly suitable for a high volume production environment.

In some embodiments, an LCOS compensator binning tool and method are provided for determining a particular compensator (or class of compensator) to use with each LCOS panel to compensate for the panel's residual retardance. One such system uses sequential contrast of a bare (non-compensated) LCOS (liquid-crystal-on-silicon) panel to estimate the panel's residual retardance. Based on this value, the ideal compensator can be chosen to maximize sequential contrast of the product.

In an example, the system uses circular polarization as the base state, accordingly, the retardance measurement system for the LCOS panel using input and output light that is circularly polarized. This is generated by the circular polarizer placed in the beam path. Assuming a perfect circular polarization state, any retardance in the optical path will change the polarization state ellipticity and reduce the extinction when passing through a second orthogonal polarizer. The reduction in extinction is described by Malus' Law. Thus, the retardance of the system can be indirectly measured by measuring the change in extinction by a pair of crossed polarizers.

In an example, the tester described here uses a single polarizer that acts as both the initial polarization element and the orthogonal analyzer. This is because the polarization state changes handedness upon reflection inside the LCOS cell. Thus, the polarizer is orthogonal to the polarization state of the reflected light. In the ideal situation, all of the reflected light would be absorbed by the circular polarizer.

The retardance axis of the LCOS cell can also be determined. In order to measure the slow axis, a retarder with a known polarization axis is placed between the circular polarizer and the LCOS panel. The best extinction will occur when the polarization axis of the retarder is perpendicular (crossed) with the polarization axis of the LCOS cell. By rotating the retarder and measuring the extinction, the cell's inherent slow axis can be indirectly measured.

In some embodiments, the system uses a specific cone angle of light to interrogate the LCOS cell, and makes a measurement based on the integration of contrast over that cone angle. The cone angle is input to the LCOS through a lens (or series of lenses), and is captured again after reflection from the LCOS by a lens (or series of lenses) and a single pixel detector.

In some embodiments, the residual retardance is derived from a measured contrast ratio. The intensity of reflected light is measured in the dark state and the bright state, and the contrast ratio can be calculated.

Before the contrast measurements, an optimal retarder angle, also referred to as the retarder alignment angle, is determined. The bias retarder is rotated to various angles (for example, using 5 angles spaced at 20 degrees). At each angle, the flux of the panel in the dark state (high voltage, for example) is measured. Dark state flux versus compensator angle is fit to a cosine function. The angle associated with the minimum of the cosine function corresponds to the optimal compensator angle, or the compensator alignment angle, for the panel under test.

With the retarder oriented at the optimal retarder angle, the sequential contrast ratio of the panel is measured by taking the ratio of the flux in the bright state (low voltage) and the flux in the dark state (high voltage). The contrast ratio (CR) is related to the retardance of the system ($\gamma$) in the following expression:

$$\frac{1}{CR} = \sin^2\left(\frac{2\pi\gamma}{\lambda}\right)$$

where CR=Contrast Ratio, γ=retardance of the system, and λ=wavelength.

Next, the residual retardance (RR) of the LCOS panel can be determined from the retardance of the system (γ) according to the following relationship.

$$RR=\gamma+Comp-ToolResidual$$

The γ calculated in this equation is the system retardance, which takes into account the retardance from the circular polarizer and the bias compensator. The residual retardance RR of the panel is calculated using the equation above. In this example, Comp is the retardance of the bias retarder, and ToolResidual is the extra retardance introduced by the circular polarizer. As used herein, the bias retarder is also referred to as the bias compensator.

Figure 2:
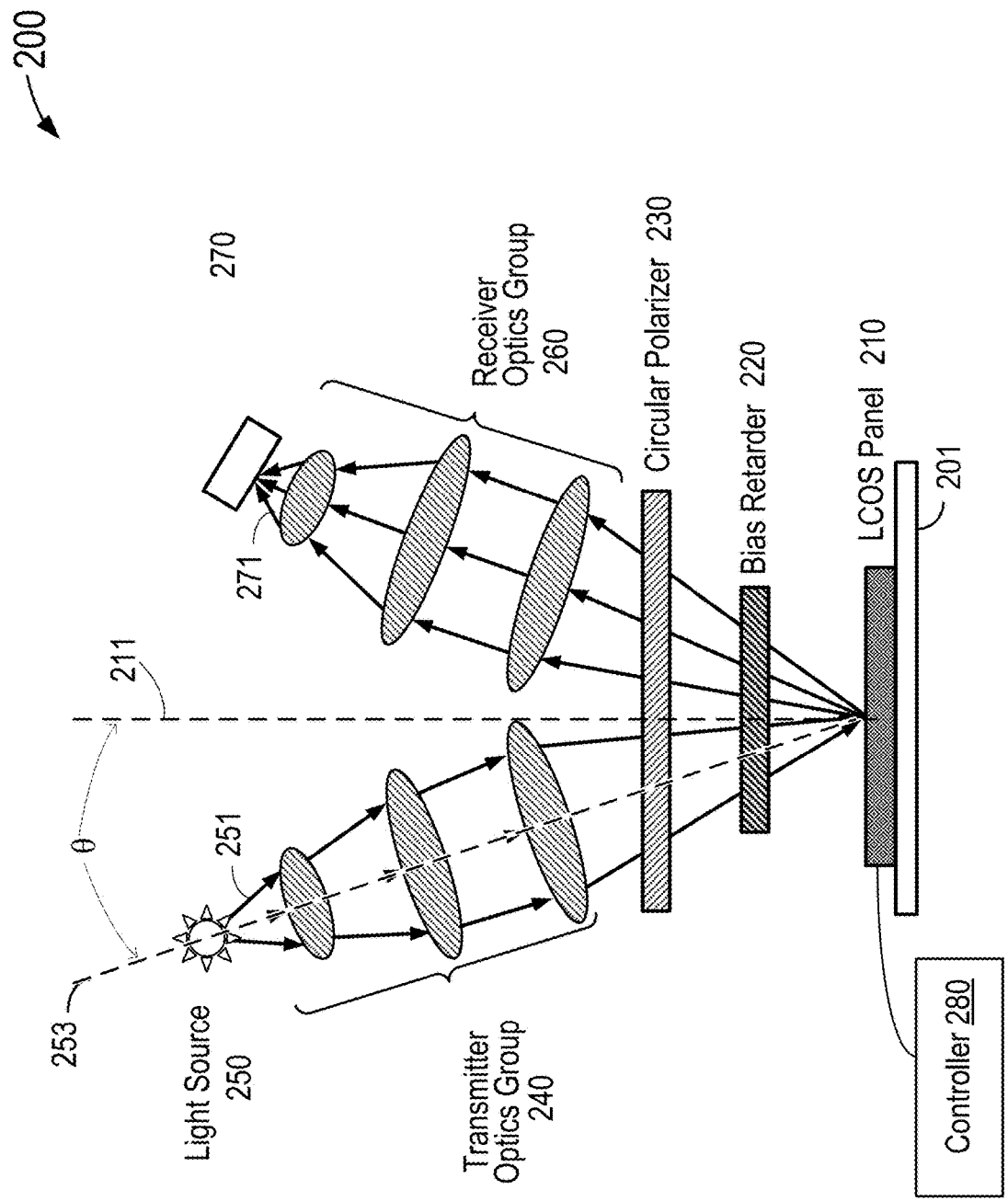
FIG. 2 illustrates a simplified schematic diagram of a system for determining residual retardance of an LCOS (Liquid Crystal on Silicon) panel according to various embodiments of the present invention.

FIG. 2 illustrates a simplified schematic diagram of a system for determining residual retardance of a LCOS (Liquid Crystal On Silicon) panel according to various embodiments of the present invention. As shown in FIG. 2, a system 200 for determining residual retardance of an LCOS panel 210 can include a support 201 for the LCOS panel 210, a bias retarder 220 disposed over the LCOS panel 210, a polarizer 230 disposed over the bias retarder 220, and a transmitter optics group 240 disposed over the polarizer 230. A light source 250 is disposed over the transmitter optics group 240. As illustrated in FIG. 2, transmitter optics group 240 includes multiple optical elements (e.g., lenses) and the particular design of transmitter optics group 240 will depend on the particular application. Transmitter optics group is configured to focus an input light beam 251 from the light source 250, through the polarizer 230 and the bias retarder 220 to the LCOS panel 210 at a non-normal angle of incidence. As shown in FIG. 2, light path 253 of input light beam 251 forms an incident angle θ with respect to the normal 211 of the LCOS panel 210.

System 200 also has a receiver optics group 260 disposed over the polarizer 230 and a detector 270 disposed over the receiver optics group 260 for measuring an intensity of light 271 reflected from the LCOS panel. As illustrated in FIG. 2, receiver optics group 260 includes multiple optical elements (e.g., lenses) and the particular design of receiver optics group 260 will depend on the particular application. The receiver optics group 260 is configured to focus a light beam reflected from the LCOS panel 210, through the bias retarder 220 and the polarizer 230, to the detector 270. System 200 can also have a controller 280.

In some embodiments, bias retarder 220 can be a low retardance plate, for example, having a retardance of about 4 nm, used to determine the rotation angle of the compensator. The rotation angle can help to determine the angle at which the compensator is placed on the LCOS panel. The retardance value of the bias retarder 220 is selected to be lower value than possible retardance value than the compensator that will be used with the LCOS panel. The low-retardance bias retarder with a known slow axis is used to determine the slow axis of the retardance of the LCOS panel.

In system 200, the polarizer 230, the bias retarder 220, and the LCOS panel 210 can be rotated to allow testing with the input light beam to reach the LCOS 210 at difference incident angles. For example, light sources of red, green, and blue light may be utilized at different incident angles.

In the example of FIG. 2, polarizer 230 is shown as a circular polarizer. In this case, the impact to residual retardance from both the s and p components of the light can be determined. In other embodiments, other types of polarizers, such as a linear polarizer can also be used. In some embodiments, the incident light beam is transmitted to the LCOS panel at a non-normal angle of incidence. In FIG. 2, input light beam 251 forms an incident angle θ with respect to the normal 211 of the LCOS panel 210. In other embodiments, a normal angle incidence can also be used. In this case, the incident angle θ is 0°. One of ordinary skill in the art would recognize many variations, modifications, and alternatives.

Controller 280 in system 200 can perform various control functions. For example, controller 280 can bias the LCOS panel 210 in a dark state or a bright state for various measurements. In some embodiments, system 200 is configured to determine the residual retardance of the LCOS panel 210 based on a contrast ratio of the bright state intensity and the dark state intensity of light reflected from the LCOS panel 210. A method for determining the residual retardance is described below in connection with FIG. 4.

Figure 3:
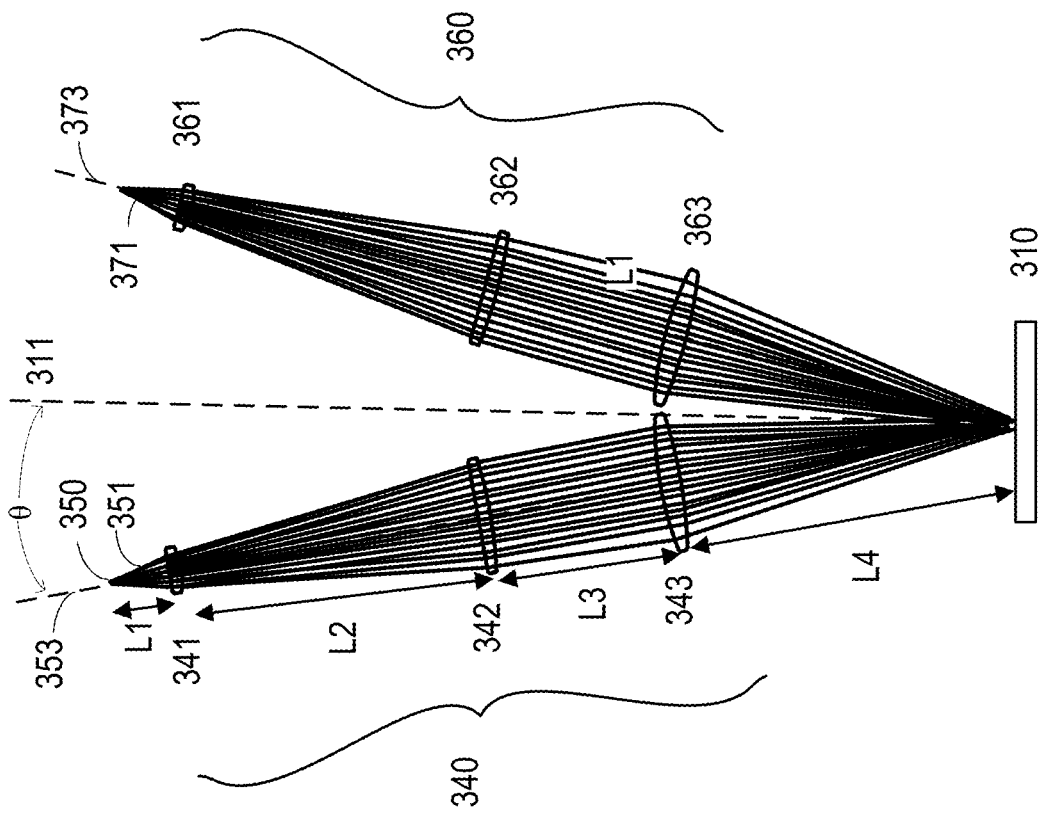
FIG. 3 illustrates light paths and optics elements in a system for determining residual retardance of an LCOS (Liquid Crystal on Silicon) panel according to various embodiments of the present invention.

FIG. 3 illustrates light paths and optics elements in a system for determining residual retardance of an LCOS (Liquid Crystal on Silicon) panel according to various embodiments of the present invention. FIG. 3 shows a transmitter optics group 340 that includes three lenses 341, 342, and 343. These lenses include a collimating lens and a focusing lens. Transmitter optics group 340 is configured to focus an input light beam 351 from a light source 350 to a LCOS panel 310 at a non-normal incident angle. As shown in FIG. 3, light path 353 of input light beam 351 forms an incident angle θ with the normal 311 of the LCOS panel 310. In some embodiments, the angle θ can be between 10 and 15 degrees. FIG. 3 further illustrates a distance L1 between light source 350 and lens 341, a distance L2 between lenses 341 and 342, a distance L3 between lenses 342 and 343, and a distance L4 between lens 343 and LCOS panel 310. In some embodiments, distances L1-L4 can be between 10 mm and 100 mm.

FIG. 3 also shows a receiver optics group 360 for directing a light beam 371 reflected from LCOS panel 30 to a detector (not shown). The receiver optics group 360 is configured to focus a light beam reflected from the LCOS panel 310 to the detector. FIG. 3 shows the receiver optics group 360 that includes three lenses 361, 362, and 363. These lenses include a collimating lens and a focusing lens. FIG. 3 also shows a light path 373 of the reflected light beam 371.

Figure 4:
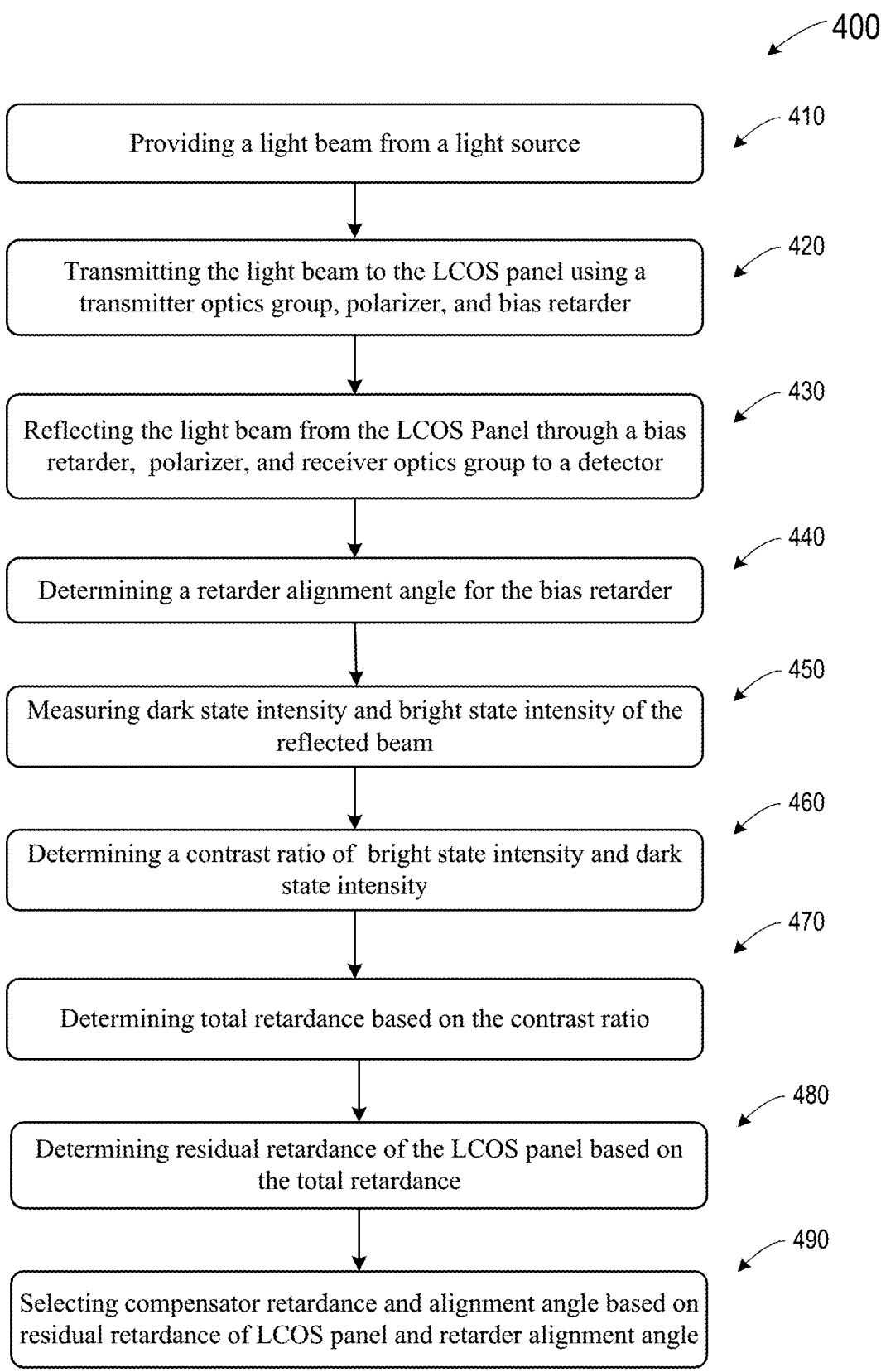
FIG. 4 is a flowchart illustrating an embodiment of a process for gradient-based exposure and gains control in a content capture device according to various embodiments of the present invention.

FIG. 4 illustrates a flowchart for a method for determining residual retardance of an LCOS (Liquid Crystal on Silicon) panel according to various embodiments of the present invention. Method 400 is a method for determining residual retardance of an LCOS panel can be implemented in a system such as system 200 described above in connection to FIG. 2. As shown in FIG. 4, method 400 includes, at 410, providing a light beam from a light source. The light source can be a laser light source delivered by, for example, an optical fiber.

At 420, the light beam is transmitted to the LCOS panel, at a non-normal angle of incidence, passing through a transmitter optics group, a circular polarizer, and a bias retarder to reach the LCOS panel. As illustrated in FIG. 2, an input light beam 251 from the light source 250 is transmitted through transmitter optics group 240, the polarizer 230, and the bias retarder 220 to the LCOS panel 210 at a non-normal angle of incidence. As shown in FIG. 2, light path 253 of input light beam 252 forms an incident angle θ with respect to the normal 211 of the LCOS panel 210. FIG. 3 shows a transmitter optics group 340 that includes three lenses 341, 342, and 343. These lenses include a collimating lens and a focusing lens. In the examples in FIGS. 2 and 3, the incident light has a non-normal angle of incidence. In other embodiments, a normal angle of incidence with a 0° incident angle θ can also be used.

At 430, the reflecting the light beam from the LCOS panel through the bias retarder, the circular polarizer, and a receiver optics group to a detector for measuring an intensity of received light beam. As illustrated in FIG. 2, a light beam reflected from the LCOS panel 210 is transmitted through the bias retarder 220, the polarizer 230, and the receiver optics group 260 to reach the detector 270. FIG. 3 shows the receiver optics group 360 that includes three lenses 361, 362, and 363. These lenses include a collimating lens and a focusing lens.

At 440, the method includes determining a retarder alignment angle, also referred to as a contrast measurement angle associated with the bias retarder, by rotating the bias retarder and measuring the intensity of the reflected light beam with the LCOS in a dark state. The rotation angle of the bias retarder associated with the minimum of the measured intensity of the reflected light beam is then determined as the retarder alignment angle, or the contrast measurement angle. In some embodiments, this retarder alignment angle or contrast measurement angle is also referred to as an optimal angle for the bias retarder since, this angle is used as a compensator alignment angle for orienting the selected compensator with respect to the LCOS panel.

At 450, with the bias retarder disposed at retarder alignment angle, or the contrast measurement angle, and the LCOS in the dark state, the method measures a dark state intensity of the reflected beam. Then, with the bias retarder still disposed at the contrast measurement angle and the LCOS in a bright state, the method measures a bright state intensity of the reflected beam. Here, the LCOS panel can be biased in the dark state or the bright state by changing the voltage applied to the LCOS panel by, for example, processor 280 in FIG. 2.

At 460, the method includes determining a contrast ratio of the bright state intensity and the dark state intensity. The contrast ratio (CR) is the ratio of the intensity of light reflected from the LCOS biased in the dark state and in a bright state.

At 470, a total retardance is determined based on the contrast ratio of the bright state intensity and the dark state intensity. In some embodiments, the total retardance (γ) can be determined based on the contrast ratio (CR) comprises using the following equation to determine the total retardance (γ):

$$\frac{1}{CR} = \sin^2\left(\frac{2\pi\gamma}{\lambda}\right)$$

where CR=Contrast Ratio, γ=retardance of the system, and λ=wavelength.

At 480, determining a residual retardance (RR) of the LCOS panel based on the total retardance. The residual retardance (RR) can be calculated using the equation above and then adjusts for the compensator already in place.

RR=γ+Comp−ToolResidual

Here, In this example, Comp is the retardance of the bias retarder, and ToolResidual is the extra retardance introduced by the circular polarizer.

At 490, selecting a compensator for the LCOS based on the residual retardance and designating the retarder alignment angle as the compensator alignment angle of the selected compensator with respect to the LCOS panel.

The method can also include selecting a compensator for the LCOS panel based on the residual retardance. In some embodiments, the test results of residual retardance (RR) are grouped into different bins. A bin is a range of residual retardance (RR) values measured by the apparatus. According to embodiments of the present invention, once an LCOS panel has been analyzed and the bin corresponding to the measured RR value of the LCOS panel has been determined, then a compensator having a retardance value associated with that particular bin can be utilized for that particular LCOS panel.

It should be appreciated that the specific steps illustrated in FIG. 4 provide a particular method for determining residual retardance of an LCOS (Liquid Crystal on Silicon) panel according to various embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple substeps that may be performed in various sequences as appropriate to the individual step. Furthermore, additional steps may be added or removed depending on the particular applications. One of ordinary skill in the art would recognize many variations, modifications, and alternatives.

In the embodiments described above, the residual retardance is measured at a single location of the LCOS panel, for example, in the center of the LCOS panel. A compensator plate is then selected based on the measured residual retardance and positioned over the entire active area of the LCOS panel in assembling the LCOS device. In alternative embodiments, residual retardance at multiple pixel positions across the LCOS panel can be measured using the method described above. In these alternative embodiments, a representative value of the residual retardance can be determined based on the residual retardance data from measuring multiple pixel positions in various manners, including average of the multiple data, root mean square value of the multiple data, weighted average, best fit, etc. The representative value of the residual retardance can then be used to select a compensator plate for the LCOS panel.

Figure 5B:
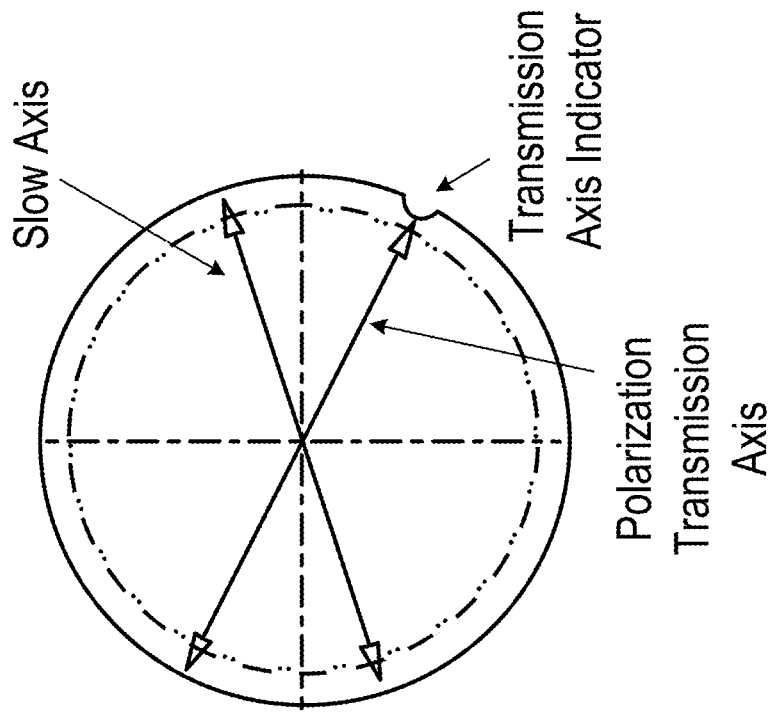
FIGS. 5A and 5B illustrate the various axes of a compensator and a circular polarizer according to various embodiments of the present invention.
Figure 5A:
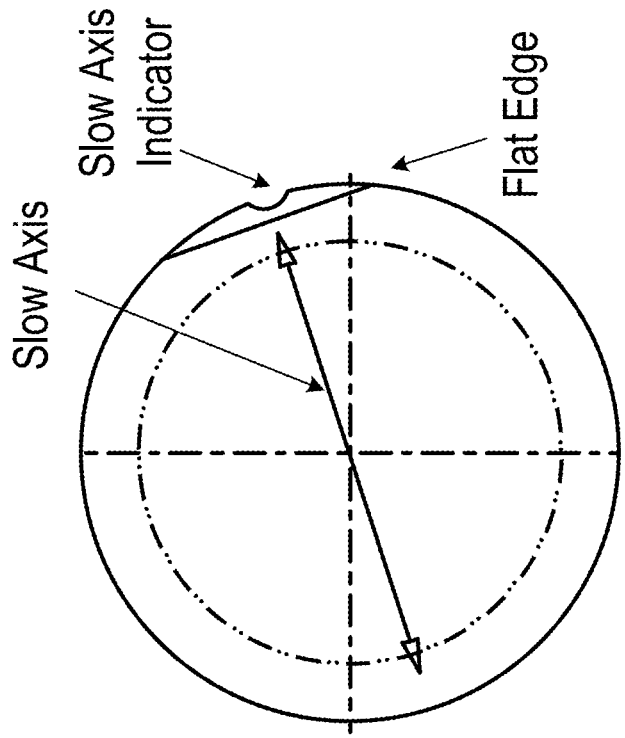

FIGS. 5A and 5B illustrate the various axes of a compensator and a circular polarizer according to various embodiments of the present invention. FIG. 5A illustrates top view of a compensator showing a slow axis of a compensator with a slow axis indicator in the form of a notch at the perimeter of the compensator. Alternatively, the slow axis may be marked by a flat edge at the perimeter of the compensator. FIG. 5B illustrates a top view of a circular polarizer, with a polarization transmission axis marked by a notch at the perimeter of the circular polarizer. FIG. 5B also shows a slow axis rotated at 45° from the polarization transmission axis. The method described above provides information for orienting the compensator with respect to the circular polarizer.

FIGS. 6A-6D illustrate plots based on an alternative method for determining residual retardance according to various embodiments of the present invention. In FIGS. 6A-6D, the horizontal axis is the ideal compensator retardance, and the vertical axis is the calculated residual retardance from measurement. For the horizontal axis, the ideal compensator is determine by either null polarimetry methods or measuring the contrast ratio with a set of discrete compensators and fitting the result to obtain the ideal compensator value. The residual retardance can be estimated from the contrast ratio (CR) measurement with no compensator, i.e., compensator retardance=0 nm, $$\frac{1}{CR} = \sin^2\left(\frac{2\pi\gamma}{\lambda}\right)$$

where CR=Contrast Ratio, γ=retardance of the system, and λ=wavelength bias.

The inventors performed an analysis using different compensators with different retardance values. In this example, a bias compensator with a 5 nm retardance is used in FIG. 6A, a bias compensator with an 8 nm retardance is used in FIG. 6B, a compensator with a 10 nm retardance is used in FIG. 6C, and a bias compensator with a 12 nm retardance is used in FIG. 6D. The residual retardance is calculated using the above equation and then adjusted for the compensator already in place, as follows.

RR=γ+Comp−ToolResidual where RR is the residual retardance of the panel, Comp is the retardance of the bias retarder, and ToolResidual is the extra retardance introduced by the circular polarizer.

Here, contrast peaks when the compensator retardance is matched to the residual retardance of the LCOS panel. Any deviation (+ or −) can reduce the contrast. As an example, if the residual retardance of the panel was 8 nm (initially unknown) and a compensator with a retardance of 5 nm was used, the measured contrast would be a first value. When the compensator with a retardance of 5 nm was replaced with a compensator with a retardance of 8 nm, a higher contrast value would be measured, and when the compensator with a retardance of 8 nm was replaced with a compensator with a retardance of 10 nm, a lower contrast value would be measured. Accordingly, the residual retardance of the panel would be determined to be 8 nm since the deviation in the contrast from 8 nm reduced the measured contrast.

Figure 6A:
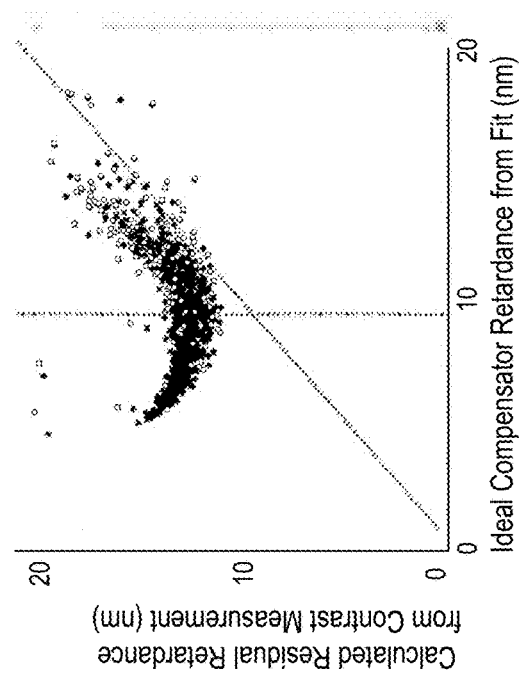
FIGS. 6A-6D illustrate plots based on an alternative method for determining residual retardance according to various embodiments of the present invention.
Figure 6B:
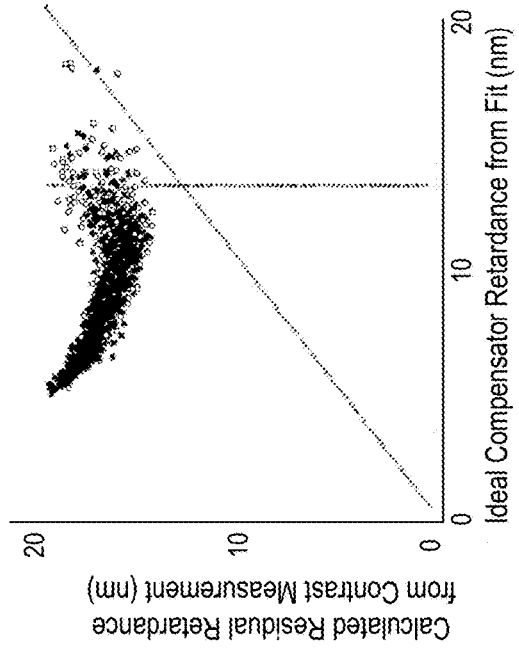
Figure 6C:
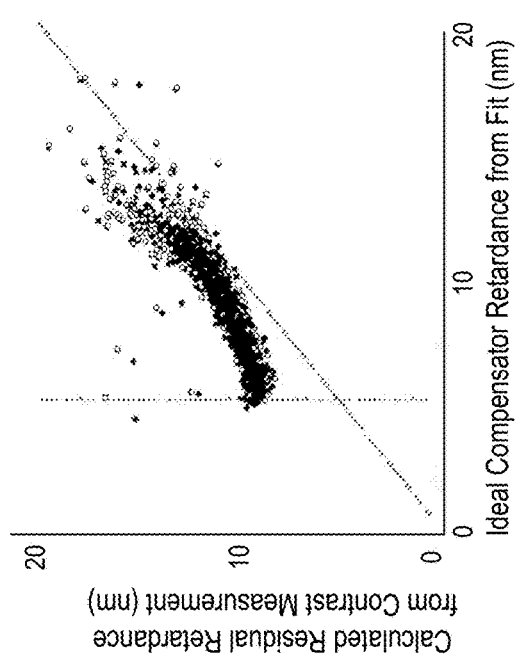
Figure 6D:
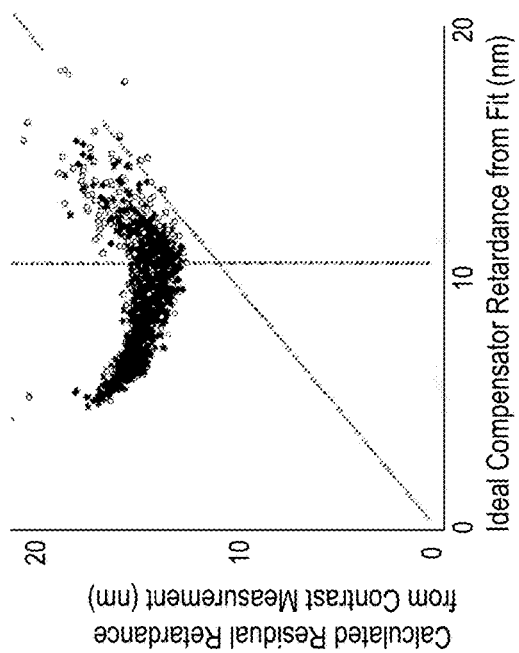

In FIG. 6A, with a compensator with a 5 nm retardance, a linear curve is produced, indicating a one-to-one correspondence between the values in the horizontal axis and the values in the vertical axis. This result is consistent with the method described above using a low retardance bias retarder in the optical path. If a low retardance bias retarder was not utilized, then only two contrast measurements would be utilized using the method described above, since given a change in contrast for different compensators, it is unclear if a lower retardance compensator is needed to determine the residual retardance or a higher retardance compensator. In FIGS. 6B-6D, and in contrast with FIG. 6A, there is no one-to-one correspondence between the values in the horizontal axis and the values in the vertical axis. Rather, there are two possible residual retardance values based on the contrast calculation. Accordingly, when using contrast measurements to determine the residual retardance, bias compensators with low retardance values were utilized. Moreover, these plots indicate that contrast measurements are an effective technique for determining the residual retardance of an LCOS panel.

The variation in contrast as a function of voltage changes (as shown below in FIGS. 7A-7D) can be used to determine if the panel was over or under compensated by the compensator in the path.

FIGS. 7A-7D illustrate plots based on an alternative method for determining residual retardance according to various embodiments of the present invention. Similar to FIGS. 6A-6D, in FIGS. 7A-7D, the horizontal axis is the ideal compensator retardance, and the vertical axis is the calculated residual retardance from measurement. For the horizontal axis, no compensator is used. The residual retardance can be estimated from contrast ratio (CR) measurement with no compensator. For the vertical axis, compensators with different retardance values are used. In this example, a compensator with a 5 nm retardance is used in FIG. 6A, a compensator with an 8 nm retardance is used in FIG. 6B, a compensator with a 10 nm retardance is used in FIG. 6C, and a compensator with a 12 nm retardance is used in FIG. 6D. The residual retardance is calculated using the above equation and then adjusts for the compensator already in place.

FIGS. 7A-7D illustrate the effect of changing the voltage applied to the LCOS panel. Changing the voltage of the panel and measurement of the contrast can be utilized to determine if the particular bias compensator being utilized results in the panel being over compensated or under compensated. In a first case, if the bias compensator has a retardance that is too low, resulting in the LCOS panel being under compensated, an increase in voltage will increase the contrast ratio (CR). For example, CR @ 3.2V−CR @ 2.8V will be greater than 0. Accordingly, it is possible to insert a bias compensator, measure the contrast associated with two LCOS panel voltages, and determine that the panel is under compensated when the contrast increases as a result of an increase in voltage.

In a second case, if the bias compensator has a retardance that is too high, resulting in the LCOS panel being over compensated, an increase in voltage will decrease the contrast ratio (CR). For example, CR @ 3.2V−CR @ 4.8V will be less than 0. Accordingly, it is possible to insert a bias compensator, measure the contrast associated with two LCOS panel voltages, and determine that the panel is over compensated when the contrast decreases as a result of an increase in voltage.

RR=|γ+sign(CR@3.2V−CR@2.8V)·Comp|

In this case, the calculated residual retardance takes into account the sign of the contrast change.

Figure 7A:
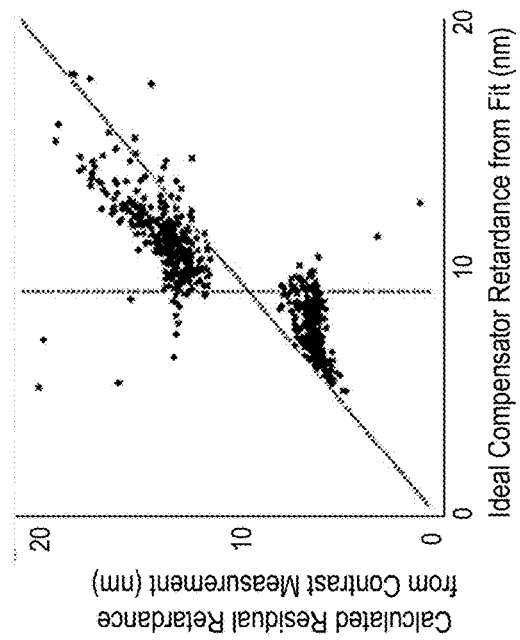
FIGS. 7A-7D illustrate plots based on an alternative method for determining residual retardance according to various embodiments of the present invention.
Figure 7B:
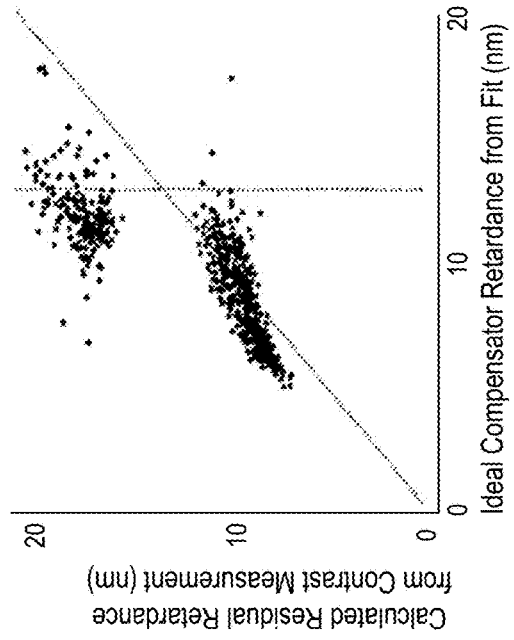
Figure 7C:
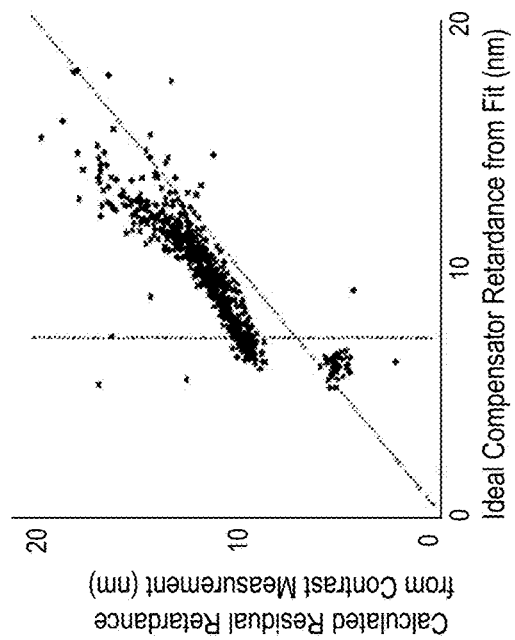
Figure 7D:
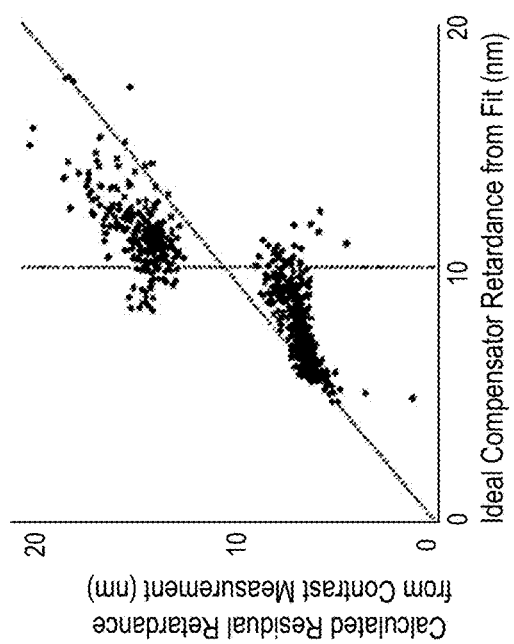
Figure 8:
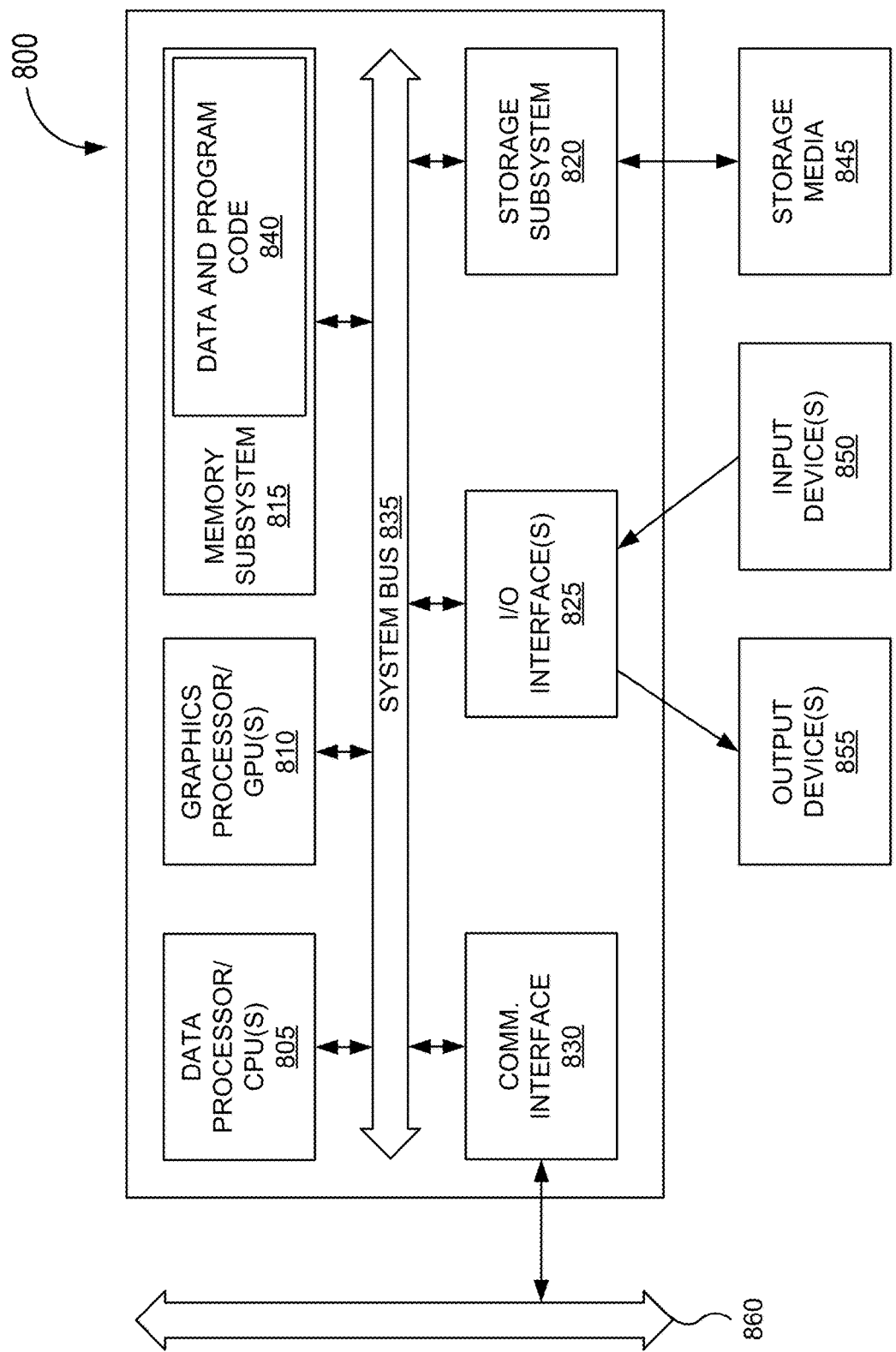
FIG. 8 illustrates an example of a block diagram for a computer system that can be used to implement various aspects in accordance of various embodiments of the present invention.

In FIGS. 7A-7D, when the bias compensator is characterized by a retardance less than residual retardance of the panel, the calculated residual retardance based on the contrast measurement will be less than the ideal residual retardance, represented by the data points to the left of the bias compensator retardance value for each plot (i.e., 5 nm for FIG. 7A, 8 nm for FIG. 7B, 10 nm for FIG. 7C, and 12 nm for FIG. 7D). Similarly, when the bias compensator is characterized by a retardance greater than residual retardance of the panel, the calculated residual retardance based on the contrast measurement will be greater than the ideal residual retardance, represented by the data points to the right of the bias compensator retardance value for each plot. As with the techniques discussed in relation to FIGS. 6A-6D, these plots indicate that contrast measurements are an effective technique for determining the residual retardance of an LCOS panel.

FIG. 8 is a block diagram of a computer system or information processing device that may incorporate an embodiment, be incorporated into an embodiment, or be used to practice any of the innovations, embodiments, and/or examples found within this disclosure.

FIG. 8 is a block diagram of computer system 800. FIG. 8 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 800 and any of its components or subsystems can include hardware and/or software elements configured for performing methods described herein.

Computer system 800 may include familiar computer components, such as one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such connectivity as inter-device communication.

The one or more data processors or central processing units (CPUs) 805 can execute logic or program code or for providing application-specific functionality. Some examples of CPU(s) 805 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 810 can execute logic or program code associated with graphics or for providing graphics-specific functionality. GPUs 810 may include any conventional graphics processing unit, such as those provided by conventional video cards. In various embodiments, GPUs 810 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 810 may include any number of registers, logic units, arithmetic units, caches, memory interfaces, or the like.

Memory subsystem 815 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 815 can include data and program code 840.

Storage subsystem 820 can also store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of data and program code 840 may be stored using storage subsystem 820.

The one or more input/output (I/O) interfaces 825 can perform I/O operations. One or more input devices 850 and/or one or more output devices 855 may be communicatively coupled to the one or more I/O interfaces 825. The one or more input devices 850 can receive information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can output information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements. A display device or monitor may be used with computer system 800 and can include hardware and/or software elements configured for displaying information.

Communications interface 830 can perform communications operations, including sending and receiving data. Some examples of communications interface 830 may include a network communications interface (e.g. Ethernet, Wi-Fi). For example, communications interface 830 may be coupled to communications network/external bus 860, such as a computer network, a USB hub, or the like. A computer system can include a plurality of the same components or subsystems, e.g., connected together by communications interface 830 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 800 may also include one or more applications (e.g., software components or functions) to be executed by a processor to execute, perform, or otherwise implement techniques disclosed herein. These applications may be embodied as data and program code 840. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 815 and/or storage subsystem 820.

Such programs may also be encoded and transmitted using carrier signals adapted for transmission via wired, optical, and/or wireless networks conforming to a variety of protocols, including the internet. As such, a computer readable medium according to an embodiment of the present invention may be created using a data signal encoded with such programs. Computer readable media encoded with the program code may be packaged with a compatible device or provided separately from other devices (e.g., via internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to," or other like phrases in some instances shall not be read to mean that the narrower case is intended or required in instances where such broadening phrases may be absent.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for determining a residual retardance of a Liquid Crystal on Silicon (LCOS) panel, the method comprising:
    providing a light beam from a light source;
    transmitting the light beam along a principal axis of a light path between the light source and the LCOS panel, wherein the light beam passes through a transmitter optics group, a circular polarizer, and a bias retarder to reach the LCOS panel, wherein the principal axis is oriented at a non-normal angle of incidence with respect to the LCOS panel;
    reflecting the light beam from the LCOS panel through the bias retarder, the circular polarizer, and a receiver optics group to a detector for measuring an intensity of a received light beam;
    determining a retarder alignment angle by:
        rotating the bias retarder and measuring an intensity of the received light beam with the LCOS panel in a dark state; and
        identifying a rotation angle of the bias retarder associated with a minimum of the intensity of the received light beam as the retarder alignment angle;
    with the bias retarder disposed at the retarder alignment angle and the LCOS panel in the dark state, measuring a dark state intensity of the received light beam;
    with the bias retarder disposed at the retarder alignment angle and the LCOS panel in a bright state, measuring a bright state intensity of the received light beam;
    determining a contrast ratio of the bright state intensity and the dark state intensity;
    determining a total retardance based on the contrast ratio of the bright state intensity and the dark state intensity;
    determining a residual retardance of the LCOS panel based on the total retardance;
    selecting a compensator for the LCOS panel based on the residual retardance; and
    designating the retarder alignment angle of the bias retarder as a compensator alignment angle of the selected compensator with respect to the LCOS panel.

2. The method of claim 1, wherein determining the residual retardance of the LCOS panel comprises removing retardance of the bias retarder and retardance of the circular polarizer from the total retardance.

3. The method of claim 1, wherein determining the total retardance (γ) based on the contrast ratio (CR) comprises using the following equation to determine the total retardance (γ):

$$\frac{1}{CR} = \sin^2\left(\frac{2\pi\gamma}{\lambda}\right).$$

where λ is a wavelength of the light beam.

4. The method of claim 1, wherein the transmitter optics group comprises a collimating lens and a focusing lens.

5. The method of claim 1, wherein the receiver optics group comprises a collimating lens and a focusing lens.

6. A method for determining a residual retardance of a Liquid Crystal on Silicon (LCOS) panel, the method comprising: transmitting a light beam from a light source along a principal axis of a light path between the light source and the LCOS panel, wherein the principal axis is oriented at a non-normal angle of incidence with respect to the LCOS panel and measuring an intensity of a reflected light beam; biasing the LCOS panel in a dark state; measuring a dark state intensity of the reflected light beam; biasing the LCOS panel in a bright state; measuring a bright state intensity of the reflected light beam; determining a residual retardance of the LCOS panel based on a contrast ratio of the bright state intensity and the dark state intensity; and selecting a compensator for the LCOS panel based on the residual retardance.

7. The method of claim 6, further comprising:
determining the contrast ratio of the bright state intensity and the dark state intensity;
determining a total retardance based on the contrast ratio of the bright state intensity and the dark state intensity; and
determining the residual retardance of the LCOS panel based on the total retardance.

8. The method of claim 7, wherein determining the total retardance (γ) based on the contrast ratio (CR) comprises using the following equation to determine the total retardance (γ):

$$\frac{1}{CR} = \sin^2\left(\frac{2\pi\gamma}{\lambda}\right).$$

where λ is a wavelength of the light beam.

9. The method of claim 7, wherein determining the residual retardance of the LCOS panel comprises removing retardance of the bias retarder and retardance of the circular polarizer from the total retardance.

10. The method of claim 6, wherein transmitting a light beam to the LCOS panel comprises transmitting the light beam thorough a polarizer to the LCOS panel.

11. The method of claim 10, wherein measuring an intensity of the reflected light beam comprises passing the reflected light beam through the polarizer to a detector.

12. The method of claim 10, wherein the polarizer comprises a circular polarizer.

13. The method of claim 12, wherein the circular polarizer comprises a linear polarizer.

14. The method of claim 6, wherein transmitting a light beam to the LCOS panel comprises transmitting the light beam thorough a transmitter optics group including a collimating lens and a focusing lens.

15. The method of claim 6, wherein transmitting a light beam to the LCOS panel comprises transmitting the light beam through a bias retarder to the LCOS panel.

16. The method of claim 15, wherein measuring an intensity of the reflected light beam comprises passing the reflected light beam through the bias retarder to a detector.

17. The method of claim 15, further comprising determining a retarder alignment angle for the bias retarder, by rotating the bias retarder and measuring the intensity of the reflected light beam with the LCOS in a dark state, and identifying a rotation angle of the bias retarder associated with a minimum of the intensity as the retarder alignment angle for the bias retarder.

18. The method of claim 17, further comprising identifying the retarder alignment angle of the bias retarder as the compensator alignment angle of the selected compensator with respect to the LCOS panel.

* * * * *